Aug. 22, 1961  F. L. JOHNSON ET AL  2,997,689
DISTANCE MEASURING APPARATUS
Filed March 26, 1946  7 Sheets-Sheet 1

Inventors
F. L. JOHNSON
F. M. MAYES
B. F. MURPHEY
J. W. JONES
By
M. O. Hayes
Attorney Aug. 22, 1961 F. L. JOHNSON ET AL 2,997,689
DISTANCE MEASURING APPARATUS
Filed March 26, 1946 7 Sheets-Sheet 2

Inventors
F. L. JOHNSON
F. M. MAYES
B. F. MURPHEY
J. W. JONES

By M. O. Hayes
Attorney

F. L. JOHNSON
F. M. MAYES
B. F. MURPHEY
J. W. JONES

2,997,689
DISTANCE MEASURING APPARATUS
Ford L. Johnson, 201 Rodney Road, Fred M. Mayes, 614 Stockton Circle, and Jack W. Jones, 616 Darby Road, all of Ridley Park, Pa., and Byron F. Murphey, Minneapolis, Minn. (627 Plymouth St. Missoula, Mont.)
Filed Mar. 26, 1946, Ser. No. 657,310
3 Claims. (Cl. 340—1)
(Granted under Title 35, U.S. Code (1952), sec. 266)

The invention herein described may be manufactured and used by or for the Government of the United States of America for governmental purposes without the payment of any royalties thereon or therefor. This invention relates to improvements in apparatus employing means for measuring distance as a function of the elapsed time between the transmission of a pulse of supersonic waves and its reception after being reflected from a surface such, for example, as the ocean bottom. More specifically, the present invention contemplates an all-electronic apparatus adapted to measure distance in the foregoing manner and having non-magnetic crystal hydrophones, with a highly accurate distance meter of novel design and including means for eliminating all signals from the circuit of the meter except the desired reflected wave.

Whereas the device shown and described herein is referred to as a depth measuring apparatus and special means is shown for using it in this application, it may also be used in aircraft for measuring the absolute altitude, or for measuring distance in any direction.

The use of supersonic frequencies for depth measurement in water is indicated by many considerations of convenience. The velocity of waves of sonic and supersonic frequency in water is in the neighborhood of 4800 feet/sec., and the time intervals involved between the transmission and reception of a pulse are sufficiently great to make measurement of them practical and economical. The use of supersonic instead of sound frequencies aids greatly in avoiding interference from extraneous sources. The practice of sending the supersonic waves in pulses offers advantages in timing and other considerations, for example, overall efficiency of power transmitted per power consumed.

In practice, however, prior art depth measuring apparatus employing the aforementioned principle utilized herein have generally been unsatisfactory because of several defects, some of which were magnified when it was attempted to use the equipment in naval applications. Some of the apparatus had magnetic qualities, particularly the transducers, which made it undersirable to use them in close proximity to other naval equipment which operated upon, or were operated by, a magnetic field or changes therein. For example, it is highly desirable that depth measuring apparatus used with mine detecting and locating equipment be entirely non-magnetic in character. The subject apparatus employing crystal transducers in non-magnetic housings was designed to meet this requirement.

Saline and humidity conditions encountered in naval service have sometimes been limiting factors upon the use of equipment. In the subject apparatus, the use of concentric cables of proper impedance permits the measuring apparatus to be placed in a protected area removed a substantial distance from the transducers or hydrophones themselves, thereby providing maximum freedom from breakdown and inaccuracies due to humidity and saline conditions. Furthermore, the subject equipment employs no moving parts, rendering it less likely to be affected by the aforementioned conditions.

Size has been a limiting factor in the use of some devices. The equipment of the subject invention is compact and readily portable.

Trouble has been encountered in the past with depth measuring apparatus employing principles similar to those of the subject invention because the detecting means employed were responsive to sounds or supersonic signals other than those emitted by the transmitting transducer. These may have originated from the machinery of the vessel itself, nearby vessels, or a variety of other sources. The present invention has provided means as will be hereafter apparent for eliminating these extraneous and unwanted signals from the receiving and metering circuits of the apparatus.

A further disadvantage of prior depth measuring apparatus has been the introduction of errors in the measurements due to inability to correct easily and quickly for changes in the temperature and salinity of the water. The temperature of the ocean changes over wide limits depending upon seasonal and geographic factors. The salinity of the ocean varies widely, especially in the neighborhood of harbors, the mouths of rivers, etc. Both salinity and temperature affect the velocity of sound in water. For example, the velocity of sound and supersonic waves in fresh water at 32 deg. F. is 4580 ft./sec., while the velocity in salt water of average salinity at 90 deg. F. is 5070 ft./sec. It is obvious that if accuracy is to be obtained from depth measuring apparatus which measures the time between the transmission of a supersonic pulse and its reception after reflection from the ocean bottom, provision must be made for quickly calibrating the equipment with respect to water conditions. The subject invention provides dual control means for the pulse repetition rate, and a pulse frequency meter directly calibrated in water temperature, so that the pulse frequency may be adjusted to the necessary value for the temperature indicated, the water temperature having been pre-measured by any suitable means. Vernier pulse frequency control also permits correction for changes in water salinity if required.

The present invention provides: a transmitter for generating and radiating waves of supersonic energy in time-spaced pulses having the most desirable characteristics for the purpose of depth measurement; receiving apparatus adapted to exclude extraneous signals or sounds as well as excluding energy which is transmitted in a direct path between the transmitting and receiving transducers, so that only the reflected wave influences the metering means; and highly accurate and reliable metering means directly calibrated in depth.

An object of the invention is to provide a new and improved apparatus for recording distance from a detecting device to a reflecting surface.

Another object of the invention is to provide new and improved means for generating supersonic signals for measuring distance from a reflecting surface.

Another object is to provide new and improved means for generating a series of supersonic signals in predetermined time-spaced relationship.

A still further object is to provide new and improved means for eliminating all signals from the recording means except the reflected signals.

A still further object is to provide new and improved means for recording the distance from a device towed under water, to the bed of the body of water through which the device is moved.

Still a further object is to provide new and improved means for correcting for variations in the temperature and salinity of the water through which the supersonic signals are transmitted.

Still a further object is to provide new and improved means for selecting a predetermined full scale reading of the depth indicating meter employed with the subject invention.

A still further object is to provide new and improved means for excluding from the indicating means signals which are received currently with the transmission of supersonic signals from a transducer.

Still other objects, features, and advantages of the invention not specifically set forth hereinabove are those inherent in or implied from a description of a preferred embodiment of the invention as will become more clearly apparent as the description proceeds, reference being had to the accompanying drawings in which:

Figure 1:
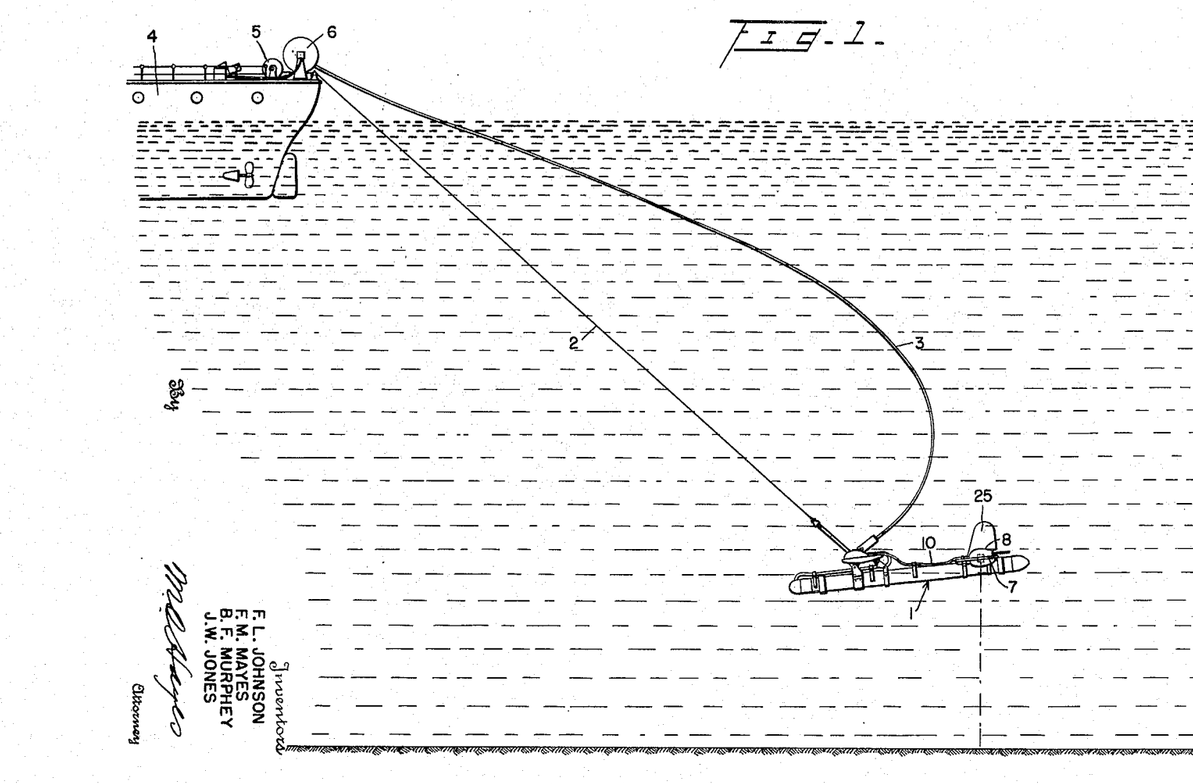
FIG. 1 illustrates hydrofoil means adapted to tow the hydrophones of the depth measuring apparatus at a distance beneath the surface.

Referring now to the drawings in which like numerals are used throughout to designate like parts, and more particularly to FIG. 1, the hydrofoil generally designated by the numeral 1, and having tow line 2 and cable connection 3 attached thereto, is shown towed by vessel 4 having reels 5 and 6 for the tow line and cable respectively. Laterally extending fins or vanes 7 located near the rear end of the hydrofoil are adapted to have mounted thereon hydrophones for transmitting and receiving the supersonic pulses. Whereas, the hydrophones are mounted on the hydrofoil in accordance with one of the aforestated objects of the invention, it will be understood that the hydrophones may be mounted upon any other supporting means therefor, according to the requirements of other embodiments of the invention.

Figure 2:
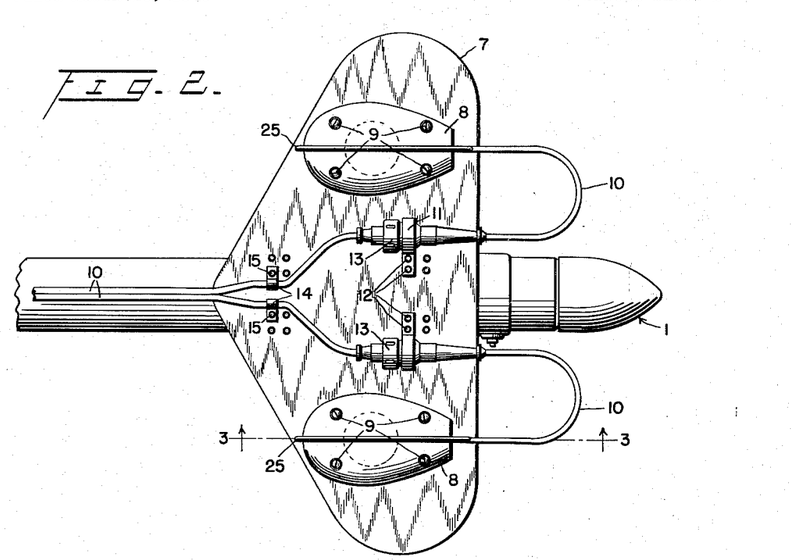
FIG. 2 is a fragmentary detailed plan view of the hydrofoil of FIG. 1 showing the transmitting and receiving transducer housings applied thereto.

Referring now to FIG. 2, there are revealed mounted upon the extended fins 7 a pair of hydrophone housings 8 fixed thereto by screws 9 and shaped so as to offer a minimum of resistance to the movement of the hydrofoil through the water. The hydrophone connecting cables 10 having connectors 13 therein are secured to the fins 7 by clamps 11 and 14 having screw means 12 and 15 respectively associated therewith.

Figure 3:
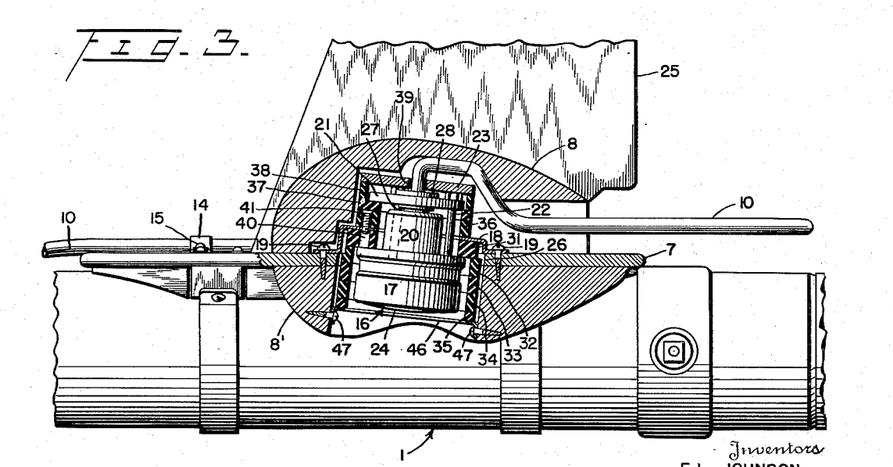
FIG. 3 is an enlarged sectional view taken substantially along the line 3—3 of FIG. 2 showing a hydrophone or transducer mounted within the housing.

Referring now to FIG. 3, it is revealed that the hydrophone housing 8 has a vertically extending fin 25 attached thereto, and has a lower section 8' beneath the vane 7, the vane having a hole 26 therein for receiving the hydrophone and hydrophone mounting. The hydrophone, generally designated at 16, may be of conventional design, and has a casing 17 of brass or other non-magnetic material containing crystals in an ambient oil medium, sound or supersonic pressures being transmitted to the crystals through the oil and the thin elastic diaphragm 24 of rubber or other suitable material. Suitable terminal means within the casing 17 provides for one electrical connection to the crystals, the metal casing itself providing the other electrical return connection. Base element 20 of brass or other suitable material, which is removable from casing 17, contains cable connecting means and is kept in hermetically sealed engagement with the casing by a washer or gasket of rubber or other suitable material diposed within an overhanging lip extending around the periphery of the lower end, and which engages a suitable hub on the base of the casing 17, these parts not being shown. The upper end of base 20 has a small hub portion 27 adapted to fit into a recessed base in the hub portion 28 of a circular disc 21, being hermetically sealed by a gasket or washer of rubber or other suitable material therein. The disc 21 is bored to receive three long screws at spaced intervals, one of which is shown at 22, and which are screwed into threaded holes in the base of casing 17, and serve to keep the disc, base, and casing firmly clamped together, and also serve to keep the hydrophone securely fixed in its housing, as will be later apparent.

It is desirable that the hydrophone be secured in such manner that shocks which the hydrofoil may be subjected to are not transmitted to the crystals. It is also desirable that means be provided so that supersonic waves generated by the transmitting hydrophone are not transmitted in great intensity through the supporting structure to the receiving hydrophone. To these ends, a number of rings 31, 32, 33, 34, and 35, of flexible material having poor sound transmission qualities, for example, a material known in the trade as "Corprene," are cemented together to form a containing means as shown, the edge of casing 17 resting in abutting relation with the shoulder of "Corprene" ring 31. Support for the lower of the rings, ring 35, is provided by a ring 46 of brass or similar material having an extending flange portion for receiving screws 47 which hold the ring 46 fixedly to the wall of the lower housing portion 8'. Support for the upper ring 31 is provided by member 18 of brass or other suitable material fixed by screws 19 to the vane 7 and the lower housing 8'. Positioned above the supporting member 18 are additional rings of "Corprene" or other suitable material 36, 37, and 38, preferably not attached to each other. Ring 36 has spaced holes for receiving three flat headed screws, one of which is shown at 41, which are adapted to be turned in threaded engagement with three holes in support 18, thereby to secure the ring 36 firmly to the support. The ends of the screws pass into three suitable holes in ring 31 adapted to receive them, one hole being shown at 40. The upper side of ring 37, which abuts upon ring 36, also extends to provide a shoulder upon which the disc 21 may be firmly secured, clamped as aforementioned by three screws 22. Ring 38 and disc 23 having centrally located hole 39 may be cemented together to form a cover for the top portion of the assembly. The total result of the mounting assembly shown is to provide shock-proof mounting means readily disassembled for the hydrophone, and offering the maximum impedance to the supersonic waves transmitted through the hydrofoil and/or vanes.

Figure 4:
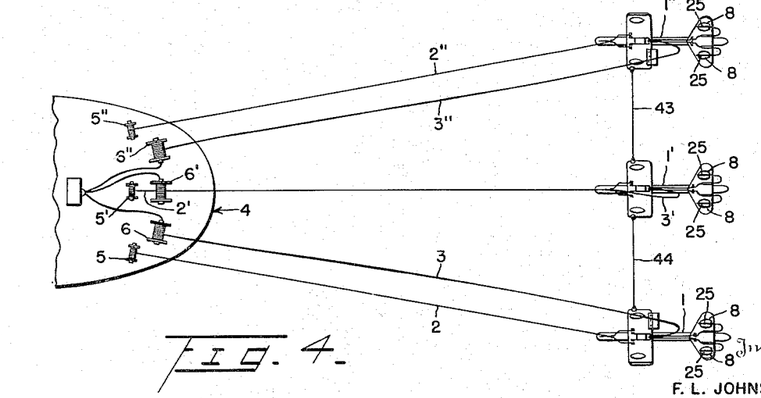
FIG. 4 illustrates schematically an arrangement in which a plurality of hydrofoils or underwater fish are towed through the water by a vessel, in predetermined spaced relation from one another, each of the hydrofoils having a pair of hydrophones attached thereto.

Referring now to FIG. 4, a group of hydrofoils 1, 1', and 1" each having a pair of hydrophone housings 8 in vanes attached thereto, are towed by ship 4 having a plurality of tow lines 2, 2', and 2" controlled from reels 5, 5', and 5" thereon, and cable connections 3, 3', 3" and reels 6, 6', and 6" therefor, the hydrofoils being maintained in predetermined spaced relation by wires or cables 43 and 44 running therebetween, it being understood that the guiding vanes on hydrofoils 1 and 1" are adjusted to keep lines 43 and 44 fully extended as the group is towed through the water. It is also understood that one transmitting and one receiving transducer are mounted on each hydrofoil.

Reference is made now to FIGURES 5, 6, 7, and 8, which show the electrical circuit of the depth measuring apparatus, conductors in the various figures being connected to similarly lettered conductors in the other figures. As stated previously, the invention employs a transmitter for sending out waves of supersonic frequency in a series of pulses, the waves being received after reflection and amplified by suitable apparatus, and then used to control suitable indicating apparatus, the elapsed time between the transmission and reception of the pulse being measured by a suitable meter calibrated in depths. To this end, the electrical circuit provides (1) power supply apparatus, (2) a transmitter including an oscillator for generating supersonic oscillations and pulses and a hydrophone for transmitting these as supersonic waves, (3) frequency measuring apparatus to measure the pulse repetition rate, (4) receiver and amplifier means, and (5) a recording circuit comprising means for measuring the time between the transmission and reception of the pulse, and (6) means for rendering the measuring means insensitive to that portion of the pulse energy which is transmitted directly between receiving and transmitting transducers, so that only the reflected wave will affect the indicating means.

Figures 5, 9:
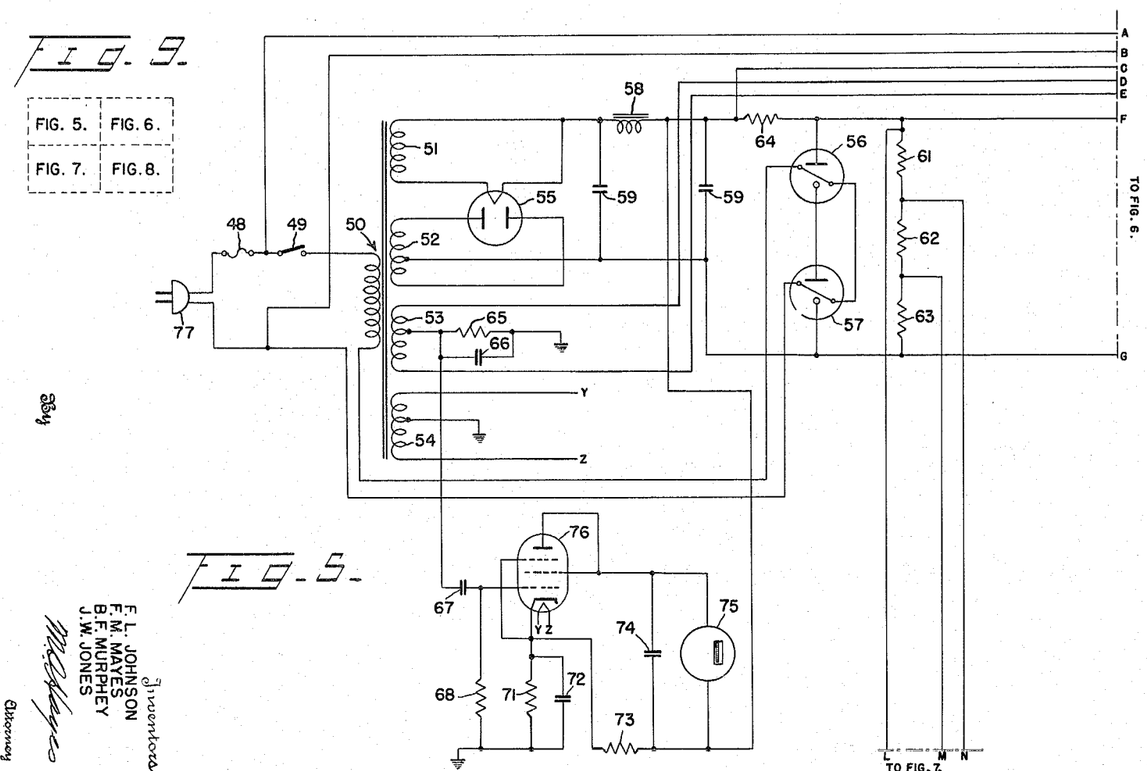
FIGS. 5 to 8 inclusive show in diagrammatic form a complete depth measuring system suitable for use with the arrangement of FIG. 4.
FIG. 9 is a chart showing the arrangement of FIGS. 5 to 8 with respect to each other.

Whereas any suitable means may be employed to supply plate, filament, and biasing potentials to the various vacuum tubes, a regulated power supply is provided, having transformer 50 with a plurality of filament secondary windings 51, 53, and 54 and high voltage winding 52, the primary circuit of the transformer including switch 49, fuse 48, plug 77, and the links in two voltage regulating tubes 56 and 57 whereby voltage may not be applied to the various tubes when either of the regulators is removed. The voltage of secondary 52 is rectified by the full wave rectifier tube 55 and filtered by inductance 58 and condensers 59. Gaseous regulators 56 and 57 assisted by resistance 64 maintain a constant voltage across the voltage divider comprising resistances 61, 62, and 63.

Figure 6:
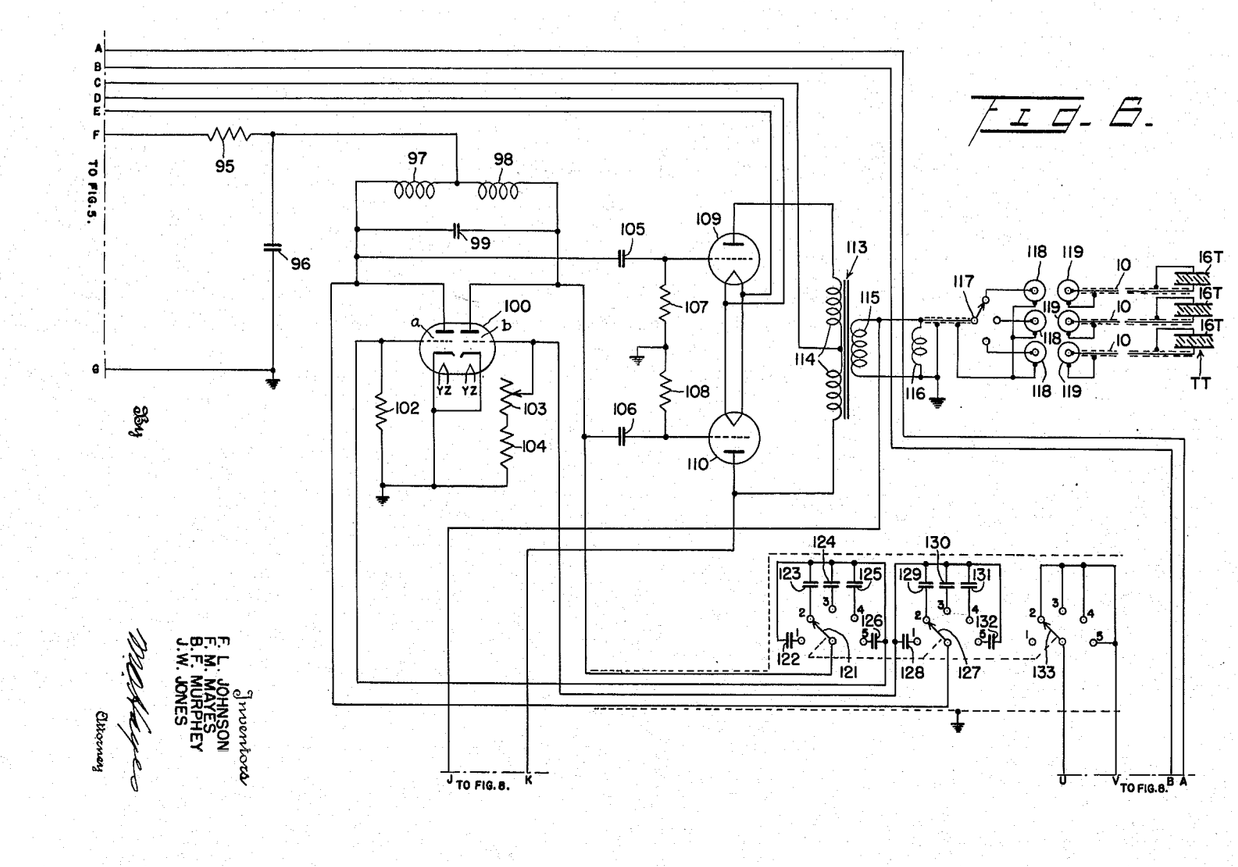

Whereas separate tubes and multiple grid tubes may be used if desired, in the present preferred embodiment both the supersonic oscillations and the pulses are generated in the dual triode 100. Whereas any suitable frequency may be used, in the present embodiment supersonic oscillations of substantially pure wave form of 45 kc. are generated, the frequency being controlled by inductances 97 and 98, and condenser 99, condenser 96 in conjunction with resistance 95 providing decoupling between the oscillator and the plate supply. In generating supersonic oscillations, the circuit may be thought of and analyzed as a negative resistance oscillator, the operation of which is well known to those skilled in the art, being expounded in Henney: Radio Engineering Handbook, third edition, page 303, and Herbert J. Reich, Proceedings Institute of Radio Engineers, November 1937, page 1387, and elsewhere; and to which the additional elements condenser 96 and resistor 95 have been added in order to secure pulsing oscillations of the desired characteristics instead of the continuous oscillations provided by the ordinary negative resistance oscillator.

It is noted that the two triode sections of tube 100, the right and left hand sections of which may be designated "b" and "a" respectively, are included in a circuit substantially similar to that of a conventional multivibrator for generating pulses. The plate of section "b" is coupled through a selected one of the condensers 122, 123, 124, 125, and 126 to the grid of section "a," which has a return to ground and cathode through resistance 102. The plate of section a is coupled through a selected one of the condensers 128, 129, 130, 131, and 132, to the grid of section b, a return to ground being provided through rheostat 103 and resistance 104. An analysis of the operation of the above circuit may be made in a manner conventional for multivibrators, it being assumed for purposes of explanation that the L-C circuit of 97, 98, and 99 is replaced momentarily by purely resistive plate loads. Neglecting the effect of inductances 97, 98, and condenser 99, if resistances to ground of the grid circuits of the two sections a and b of dual triode 100 are equal, and the coupling condensers 123 and 129 are equal, the multivibrator output would be symmetrical, pulses of substantially square wave form occurring alternately in the plate circuit of each section, with substantially no interval between pulses. However, due to the presence of the tuned circuit between the plates of the two tube sections, and the aforementioned condenser 96 and resistance 95, in the generation of pulsed oscillations in tube 100 for transmittal from the transmitting hydrophones, the following characteristics are secured:

(1) The pulse duration is small in comparison with the interval between pulses.

(2) The leading edge of the pulse is so sharp that maximum amplitude of the pulse is reached in a time which is small compared to the tolerable error in the time of measurement. The trailing edge of the pulse is relatively sharp also.

(3) The 45 kc. supersonic oscillations in the pulse envelope are of substantially pure wave form. This is necessary in order that the receiving amplifier, to be subsequently described more fully, and which is sharply tuned for noise discrimination, will pass most of the energy in the pulse.

It should also be noted that:

(4) It is possible to adjust the pulsing rate over a wide range, leaving unchanged the shape of the pulse, by changing the value of the coupling condensers.

(5) The pulsing rate is a stable and linear function of some circuit parameter, while the frequency of the 45 kc. supersonic oscillations in the pulse envelope remains constant as the pulse rate is changed.

All of these conditions are the result of the circuit of tube 100. The circuit parameters are so chosen that the grid bias is built up to its maximum value over a period of several cycles of the supersonic oscillations, and the maximum value of grid bias is below the cut-off characteristic of the tube. Operation of the circuit is substantially as follows: When plate voltage is applied, oscillations in the L-C circuit 97, 98, 99 between plates build up, and the grids of the tubes become increasingly negative due to the rectifying action therein. When this voltage approaches a value somewhat larger than the cut-off bias of the tubes, grid blocking occurs. The effective negative resistance of the circuit vanishes or reaches a value which also favors a decrease in the amplitude of oscillations. Because of these complementary factors, a rapid decrease in the amplitude of oscillations results, leaving the grid at a high negative bias. The values of grid resistor and coupling condenser determine the time required for the grids to return to the bias at which plate current can again flow, and consequently the interval between pulses.

The accuracy of measurement of this device depends substantially on the shape or envelope of the transmitted pulse. As previously stated, it is desirable that the pulse build up to its maximum value very rapidly in order to provide a stable initial reference for the time measurement. It is also desirable that the pulse shall decay from the maximum value rapidly in order that the pulse duration will be sufficiently short so as not to interfere with the measurement of short distances, for example, of the order of one to two feet. These characteristics of the pulsing oscillator are achieved by use of the combination of condenser 96 and resistor 95. This combination, in addition to providing the decoupling action referred to above, produces the following results:

(1) The condenser 96 provides a plate voltage source of initial high voltage and very low impedance to the 45 kc. oscillations. This condenser, therefore, assists in the sharp initial rise of the pulse envelope.

(2) Since the condenser 96 is not sufficiently large to furnish energy for sustained pulses of long duration, and since the current furnished by the power supply is limited by the resistance 95, the voltage supplied to the pulsing oscillator tube by the condenser 96 decreases rapidly. This characteristic assists in obtaining the sharp decay characteristics of the pulse.

If the values of condenser 96 and resistor 95 are not properly chosen, the oscillator may oscillate continuously or may fail to oscillate. If the combination of condenser 96 and resistor 95 is replaced by a low impedance voltage source such as a battery, the decay characteristics of the pulse will not be as sharp as those obtained in the device described herein.

The pulsing rate can be altered by varying either coupling condensers or grid resistors. It is desirable to use one parameter for a step control on the pulse rate, and to use as a trimming frequency adjustment a parameter which can be continuously varied over a limited range and will vary each step pulsing rate by the same percentage. The coupling condensers provide step variations for the pulse frequency and provide for several depth ranges, in a manner to be subsequently explained. The variable resistor 103 provides vernier pulse frequency control, and is used for adjusting the pulse frequency to compensate for changes in the temperature and/or salinity of the water, in a manner to be more fully explained subsequently.

Condensers 105 and 106 couple the plates of tube 100 to the grids of a pair of amplifier tubes 109 and 110, resistors 107 and 108 providing grid return to ground therefor respectively. Whereas triodes are shown, it is understood that multi-grid tubes may be used if desired. Filament potential for tubes 109 and 110 is supplied through leads D—E from center-tapped secondary 53 of transformer 50, return to ground being through resistance 65. The outputs of the tubes are supplied to the center tapped primary 114 of a balanced transformer 113 having secondary 115. Plate voltage is supplied through leads C—C. The secondary output after filtering and some shaping by choke 116 is supplied through switch 117 and associated connectors 118—119 and cable 10 to a selected one of the transducers 16T, it being understood that each of these transmitting transducers may be mounted on one of the hydrofoils shown in FIG. 4.

Figure 7:
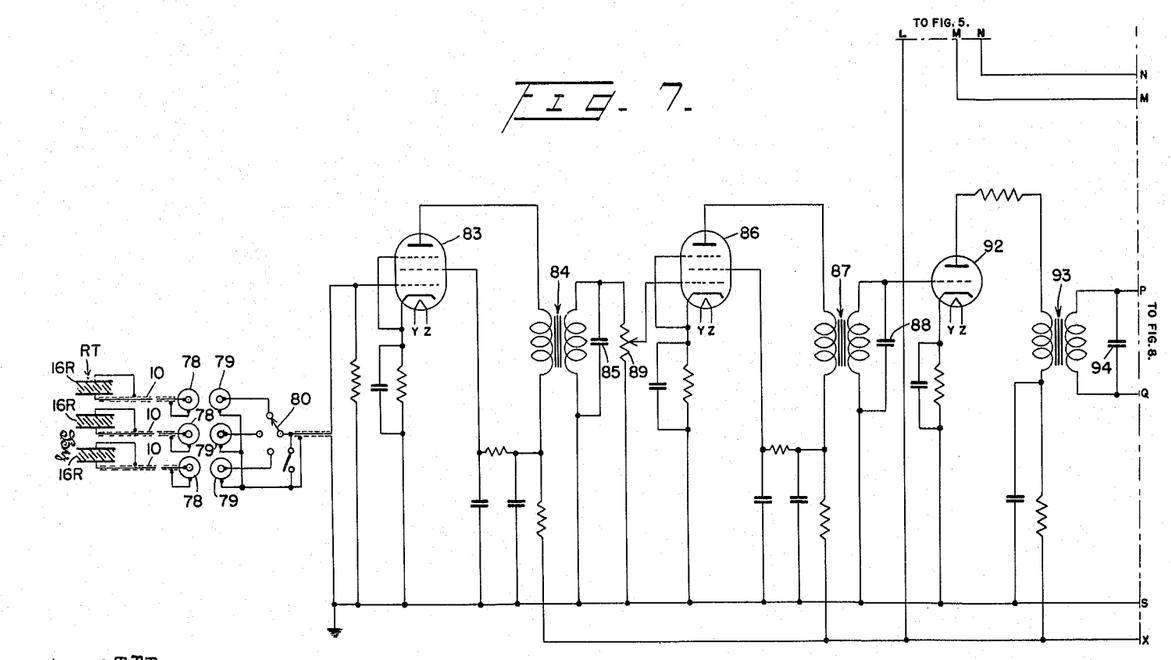

Reference is made now to FIG. 7, which shows the receiving apparatus. A plurality of receiving hydrophones 16R are provided, one of the hydrophones being carried by each of the hydrofoils of FIG. 4 so disposed thereon as to be most receptive to signals of the adjacent transmitting hydrofoils after reflection from the bottom of the body of water through which the hydrofoil is towed. The hydrophones are connected through individual cables 10 and through connectors 78—79 to a switch 80 for selecting the hydrophone whose output is desired to excite the amplifier tube 83.

The vacuum tubes 83, 86, and 92 and associated components form a high gain cascade amplifier of conventional design, having gain control 89. The amplifier is made discriminative against unwanted signals by tuning the secondaries of the coupling transformers 84, 87, and 93 by condensers 85, 88, and 94 respectively, to the frequency of the supersonic oscillations generated in tube 100. Plate voltage is supplied all the aforementioned tubes from the power supply of FIG. 5 through the lead wire L—L.

Figure 8:
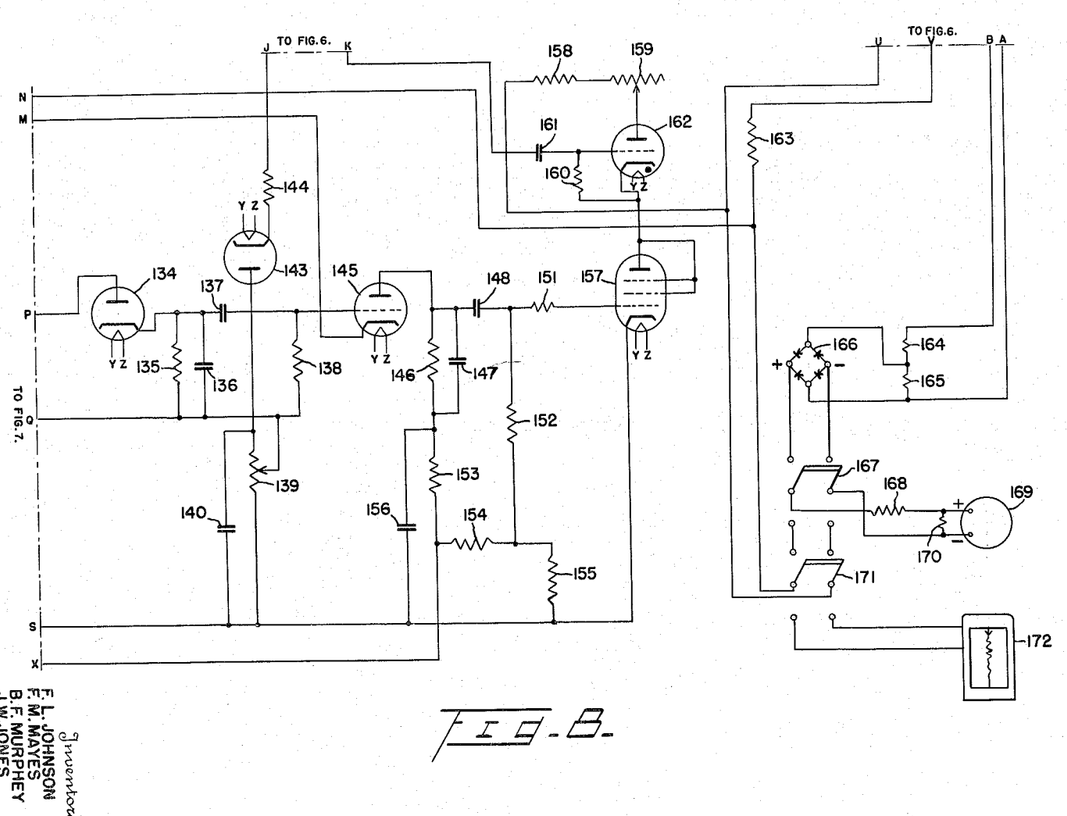

Reference is made now to FIG. 8, which shows the electrical circuit for measuring the time interval between the transmission of a pulse by one of the hydrophones 16T and its reception by an associated receiving hydrophone 16R. A current indicating meter 169 adapted to read the average value of current in its circuit is provided, and may have its scale calibrated directly in feet in a manner to be hereafter described. Shunt resistance 170 and current limiting resistance 168 are provided therefor as shown. Neglecting for the moment the resistance 163 which is adapted to shunt the meter 169 when the switch 133 is in the position shown, when switch 167 is closed in downward position, and switch 171 is closed in its upward position as viewed in FIG. 8, then the circuit of meter 169 is traced as follows: From the tap between resistances 61 and 62 of the power supply voltage divider through lead N—N to switch 171, switch 167, resistance 168, meter 169, switch 167, switch 171, resistance 158, rheostat 159, plate to cathode of gas triode 162, cathode of 162 to plate of tube 157, plate to cathode of tube 157, to ground. The meter 169 thus reads the current flowing through the tubes 157 and 162. Whereas tube 157 is shown as a pentode connected as a triode, any suitable tube may be used.

In the preferred embodiment of the subject invention, the flow of current in the above described circuit is initiated by firing the gas triode 162 when the pulse is transmitted, and the flow of current is stopped by applying a bias to tube 157 when the pulse is received, a bias at least sufficiently negative to cut off the flow of current.

The manner in which the gas triode 162 is fired is substantially as follows: A pulse or A.-C. voltage from the plate of tube 110 is applied through lead wire K—K and condenser 161 to the grid of tube 162, a positive voltage being thereby developed on the grid of sufficient amplitude to fire the tube under the circuit conditions existing when the circuit is idle, that is, when no negative bias is being applied to tube 157. This initiates the flow of current in the circuit and the meter 169 shows a deflection. Resistance 160 is provided for slowly removing the positive charge from condenser 161 and thereby the voltage from the grid of tube 162 after it has fired, so that it will be ready to repeat the operation after the desired time interval between pulses.

The reflected pulse, after reception by a hydrophone 16R and amplification by the aforedescribed amplifier circuit, is rectified by diode 134, which is connected by leads P—Q to the secondary of transformer 93, integrated by the network of resistance 135 and condenser 136, and applied through condenser 137 as a positive pulse on the grid of tube 145, grid return to ground being supplied by resistances 138 and 139.

It is noted that the tube 145 is normally heavily biased, since the cathode is brought through lead M—M to a positive point on the power supply voltage divider, being connected as shown between resistances 62 and 63. Tube 145 is biased beyond cut-off in order to eliminate all noises which are below the bias threshold. The positive pulse applied from diode 134 is amplified by tube 145, and applied as a negative pulse on the grid of tube 157, reducing the grid voltage of this tube to the cut-off point or below, reducing the plate current to zero and effectively opening the plate circuit of gas triode 162. The current through this tube falls to zero, and the duration of the negative pulse on the grid of tube 157 is sufficiently long, as predetermined by the circuit constants of pulse generator tube 100, to result in the complete de-ionization of tube 162. After the negative pulse is removed from the grid of tube 157, although this tube is restored to conductivity, current will not flow in tube 162 until another positive ignition pulse is received from tube 110.

In the plate circuit of tube 145, the output voltage is developed across resistance 146, with condenser 147 in parallel with resistance 146 providing some shaping of the waveform. Condenser 156 is a bypass to ground, and resistor 153 is a plate decoupling and dropping resistor. The resistors 154 and 155 comprise a voltage divider for obtaining a small positive voltage for biasing tube 157, bias being applied through resistors 152 and 151. As previously indicated, it is desirable that this tube 157 be normally conductive to a high degree except when negative pulses are applied to the grid thereof from tube 145. The output from the plate of tube 145 is coupled to the grid of tube 157 through condenser 148 and resistance 151.

As stated previously, an object of the invention is to provide means for rendering the meter and pulse interval timing circuit momentarily insensitive to supersonic energy transmitted in a direct line between the transmitting and receiving transducers, or through the supporting structure of the hydrofoil. To this end a squelch circuit including diode 143 is provided, and is traced as follows: From the secondary 115 of transformer 113, through lead J—J and resistance 144 to the cathode of diode 143, thence from the plate through potentiometer 139 in parallel with condenser 140, to ground. The operation of this circuit is substantially as follows: Output pulses negative with respect to ground, are applied through current limiting resistance 144, to the diode where they are rectified, making the end of potentiometer 139 nearest the diode negative with respect to ground. Voltage taken from this potentiometer is applied through resistance 138 to the grid of tube 145, placing a high negative bias thereon. This negative bias is of sufficient strength as predetermined by the circuit constants to render tube 145 insensitive to any positive voltage which may be simultaneously applied from diode 134 due to energy reaching receiving transducer 16R. The meter circuit is thus rendered unresponsive to pulses transmitted in a direct line between transmitter and receiver hydrophones, being activated as desired only by the reflected wave. Condenser 140 provides integration, and sustains the negative cut-off potential on tube 145 for a slight interval after the pulse has been transmitted, but not long enough to interfere with the operation of the circuit as controlled by a reflected pulse.

The operation of all the above described circuits in measuring the distance between the transmitting and receiving hydrophones and the bottom of the body of water through which the supersonic energy is transmitted and reflected may be summarized substantially as follows: A pulse of supersonic oscillations, generated in tube 100, is fed through the condensers 105 and 106 to the tubes 109 and 110 of the push-pull power amplifier. This pulse or the voltage of supersonic frequency therein is transmitted through lead K—K and applied through condenser 161 as a positive voltage on the grid of gas tube 162, igniting the tube.

Maximum current begins to flow substantially instantaneously through tubes 157 and 162 and meter 169, being limited by the circuit parameters. Simultaneously therewith, the pulse in the plate circuit of tube 109 or 110, after 180 degree phase shift in transformer 113, is applied through switch 117, and connectors 118 and 119, and concentric cable 10 to one of the transmitting transducers 16T.

Energy from the transmitting transducer reaches the receiving transducer by two paths, i.e., (1) after reflection from the bottom of the body of water, and (2) transmittal in a direct line between the two transducers through the water and the supporting structure.

Energy reaching the receiving transducer in a direct line is prevented from affecting the meter circuit. The negative pulse in the secondary 115 of transformer 113 is applied through lead J—J and resistance 144 to diode 143, which begins to conduct. A substantial negative voltage is developed across resistance 139, which is applied through resistance 138 to the grid of tube 145. This negative voltage prevents this tube from being responsive, in a manner heretofore explained, to energy reaching receiving hydrophone 16R substantially simultaneously with the transmittal of the pulse.

The reflected wave, after travelling twice the distance between the hydrophones and bottom, reaches one of the receiving hydrophones 16R, which are connected by cables 10, connectors 78—79 and switch 80 to the input circuit of a tuned amplifier comprising tubes 83, 86, and 92, where it is amplified in an amount determined by the setting of gain control 89 and applied through leads P—Q to diode 134. After rectification by diode 134 and integration in the R-C network 135—136 it is applied as a positive voltage through condenser 137 to the grid of tube 145, where it is amplified and thence applied through coupling condenser 148 and current limiting resistor 151 as a negative voltage on the grid of tube 157, changing the bias voltage on this grid from a slightly positive bias to one at least sufficiently negative to cut off the flow of plate current entirely, thus stopping the flow of current in meter 169. This cut-off condition of tube 157 exists long enough so that gas tube 162 is completely de-ionized.

Full current flows from the moment of transmission of a pulse until its reception, when the current it totally stopped, and no current flows until the next pulse is transmitted. It is apparent that the average current flowing in the circuit will be determined by two factors; (1) the time between transmission and reception, which is also a measure of twice the distance between the transducers and the reflecting surface, the speed of propagation in the intervening medium being known, and (2) the repetition rate of the transmitted pulses, it being assumed beforehand that no pulse occurs before the previous pulse has been received. It will be apparent to those skilled in the art to which the invention pertains, that the scale of meter 169 may be calibrated in feet, the speed of propagation of supersonic waves in the water being known, and the pulse repetition rate being known.

It has been previously stated that it is desirable to provide a number of depth ranges on the indicating meter 169. In the present preferred embodiment, means is provided for increasing or decreasing the pulse rate in predetermined steps or amounts. Whereas any convenient ranges may be provided, the present embodiment provides five ranges of 12.5, 25, 50, 100, and 200 feet, with pulse rates of 160, 96, 48, 24, and 12 pulses/sec. respectively, it being noted that as the depth increases the pulse rate decreases.

Referring to FIG. 6, there are revealed at 121, 127, and 133 three aforementioned multiple position switches adapted to be ganged or otherwise simultaneously rotated. Switch 121 connects a selected one of the condensers 122, 123, 124, 125, or 126 to provide the desired coupling between the plate of section $b$ and the grid of section $a$ of tube 100. Switch 127 connects a selected one of the condensers 128, 129, 130, 131, and 132 to provide the desired coupling between the plate of section $a$ and the grid of section $b$ of tube 100. The capacities of the condensers associated with switch 121 may be substantially equal to the capacities of the corresponding condensers associated with switch 127. As previously explained, the varying of these circuit parameters of tube 100 results in changes in the pulse repetition rate.

Referring again to FIG. 6, it is noted that a third switch 133 has a plurality of contacts arranged to connect the resistance 163 through leads U—V in shunt with the meter 169 and its resistance 168 on all depth ranges except on the shortest range. When it is desired to have a very short range on the meter, the switch 133 is moved to position 1 whereby the shunt 163 is removed for the reason that the cut-off pulse must be approximately 1 millisecond wide, which corresponds to approximately 2 feet of water depth. An objectionable dead spot on the 12.5 foot range is avoided by using a pulsing rate of 160 pulses per second, which is out of proportion with the other pulse rates by a factor of 1/6. When the current through meter 169 is adjusted as by a selection of a proper resistance value for resistance 168, to give full scale on the last four ranges, the first range (160 pulses/sec.) is off scale by 1/6 of the total current. As this condition represents 15 feet of water depth, the full scale reading corresponds to 5/6 of 15 feet, or 12½ feet.

As stated previously, one of the objects of the invention is to provide depth measuring apparatus readily and quickly corrected for changes in the temperature and/or salinity of the water. To this end, the aforementioned vernier pulse frequency control rheostat 103 is provided in the grid return circuit of section $b$ of tube 100, and a frequency measuring circuit is provided for accurately measuring the pulse frequency on at least one range of the meter. This frequency meter is designated at 75 in FIG. 5. Whereas any convenient frequency measuring device may be used, the present embodiment provides an instrument having a plurality of vibrating reeds adapted to vibrate selectively in response to pulses within a predetermined one of a plurality of frequency ranges. Secondary 53 which provides filament voltage for the pulse amplifier tubes 109 and 110 has a center tap which is returned to ground through resistor 65 in parallel with condenser 66. A portion of the voltage of pulse frequency developed across the resistor 65 is coupled through condenser 67 to the control grid of a vacuum tube 76 having meter 75 in its plate circuit. Bias is supplied the tube 76 by resistor 71 paralleled by condenser 72; grid return to ground is through resistor 68. Resistor 73 and condenser 74 complete the plate circuit, plate voltage being supplied from the power supply as shown.

Whereas the meter 75 may read directly in pulse frequency, in the present embodiment of the invention the meter has a temperature scale including a plurality of values corresponding respectively to the frequency ranges of the several reeds, and the pulse frequency of tube 100 is adjusted at 103 until the particular reed corresponding to the desired temperature value is caused to vibrate, meter 75 thereby indicating that the frequency is correct for the water temperature, as pre-measured by any suitable means.

Figure 10:
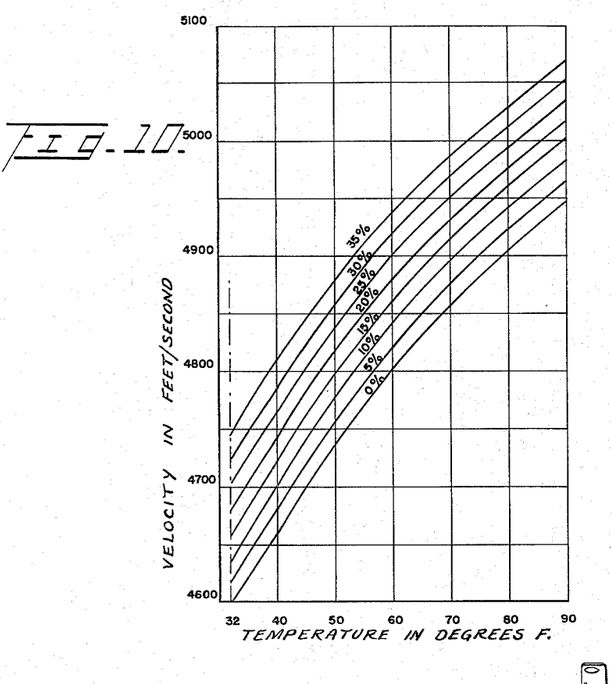
FIG. 10 is a chart showing the velocity of supersonic waves through water for different degrees of temperature and salinity of the water.

Reference is made now to FIG. 10, which shows the velocity of sound and supersonic waves in feet per second in water for different degrees Fahrenheit of temperature. Each curve is a plot of velocity vs. temperature for a different percentage of salinity. This chart may be used in adjusting the aforementioned vernier frequency control 103.

Referring again to FIG. 8, a circuit for checking the line voltage of the source of power is provided, wires A—B leading to the primary power supply plug 77 through fuze 48 as shown. The output of the voltage divider 164—165 of FIG. 8 is applied to full wave rectifier 166 of copper oxide or other suitable form, and when switch 167 is closed in its up position as viewed in FIG. 8, the rectified voltage is applied to meter 169 through resistance 168. Suitable points may be marked on the meter scale to indicate the limits of tolerance of line voltage variation, as measured thereby.

A recording meter 172 is also provided for making permanent records or traces of the depth as the vessel or hydrofoil moves, switch 171 when closed in its down position, as viewed in FIG. 8, connecting the recording meter in the metering circuit.

Whereas the use of oscillations of supersonic frequency has been indicated as preferable, oscillations of sound or sonic frequencies may be used if desired without modification of the subject apparatus.

While the invention has been described with reference to a certain preferred example thereof which gives satisfactory results, it will be understood by those skilled in the art to which the invention pertains, after understanding the invention, that various changes and modifications may be made without departing from the spirit and scope of the invention, and it is our intention, therefore, in the appended claims to cover all such changes and modifications.

What is claimed as new and desired to be secured by Letters Patent of the United States is:

1. Distance measuring apparatus comprising, in combination; a transmitter circuit including means for generating pulses of oscillations of supersonic frequency; a transmitting transducer energized thereby for radiating waves at said supersonic frequency; a receiving transducer; a receiving circuit energized therefrom including a first rectifier tube; a meter circuit operatively connected to said transmitter circuit and to said receiving circuit and having a meter therein adapted to give a deflection proportional to the time interval between the transmission of a pulse and its reception after reflection from a reflecting surface, thereby to measure the distance travelled by said waves; a vacuum tube having at least a control grid and adapted to control the operation of said meter circuit; means for applying the output of said first rectifier tube as a positive voltage on the grid of said vacuum tube; a second rectifier tube energized from said transmitter circuit; and means for applying the output of said second rectifier as a negative voltage on said control grid of said vacuum tube, the negative voltage being at least greater in amplitude than the positive voltage, whereby said vacuum tube is uninfluenced by said positive voltage when said positive voltage is applied substantially simultaneously with said negative voltage.

2. Distance measuring apparatus employing means responsive to the elapsed time between the transmission of a pulse of supersonic waves and its reception after reflection from a surface thereby to obtain an indication of the distance travelled by said waves, comprising a transmitter including a transducer; a receiver including a transducer; a meter circuit including a gas tube, a first vacuum tube having a control grid, and a meter indicating the current flowing through both of said tubes; circuit means connecting said gas tube with said transmitter whereby the transmission of a pulse initiates the flow of current therein; a second vacuum tube for controlling the voltage on the control grid of said first vacuum tube; a first circuit connecting said second vacuum tube with said receiver and adapted to bias said first vacuum tube to cut-off when energy reaches the transducer of said receiver thereby to render said meter circuit non-conductive; and a second circuit connecting said second vacuum tube with said transmitter and adapted to prevent response of said meter circuit to energy received at the transducer of said receiver substantially simultaneously with the transmission of said pulse.

3. Distance measuring apparatus comprising transmitting means adapted to radiate pulses of energy of supersonic frequency in a perdetermined direction; receiving means disposed near said transmitting means and sensitive to waves of said supersonic frequency; meter means; a first circuit operatively connecting said meter means with said transmitting means; a second circuit operatively connecting said meter means with said receiving means; said meter means being adapted to give an indication proportional to the time interval between the transmission of a pulse and its reception by said receiving means after reflection from a surface, thereby to indicate the distance travelled by said waves; said second circuit including a vacuum tube having a control grid; and rectifier means controlled from said transmitting means for placing a relatively high negative voltage on the control grid of said vacuum tube when the pulse is transmitted thereby to block said tube and render said meter means insensitive to energy of supersonic frequency transmitted in a substantially direct path between the transmitting means and the receiving means.

References Cited in the file of this patent

UNITED STATES PATENTS

| | | |
|---|---|---|
| 1,853,119 | Fessenden | Apr. 12, 1932 |
| 1,858,931 | Langevin | May 17, 1932 |
| 1,885,652 | Touhy | Nov. 1, 1932 |
| 2,055,883 | Terry | Sept. 29, 1936 |
| 2,131,993 | Wittkuhns | Oct. 4, 1938 |
| 2,284,654 | Harrison | June 2, 1942 |
| 2,312,934 | Shook | Mar. 2, 1943 |
| 2,371,988 | Granqivst | Mar. 20, 1945 |
| 2,446,937 | Lorance | Aug. 10, 1948 |
| 2,447,333 | Hayes | Aug. 17, 1948 |
| 2,460,316 | Trent | Feb. 1, 1949 |